2,939,806

SUBBED CELLULOSE TRIACETATE PHOTOGRAPHIC FILM

Joseph Jaffe, Roselle Park, and Alfred Schneider, Belleville, N.J., assignors to Celanese Corporation of America, New York, N.Y., a corporation of Delaware No Drawing. Filed Apr. 16, 1956, Ser. No. 578,184

2 Claims. (Cl. 117—82)

This invention relates to subbed cellulose triacetate photographic film, and relates more particularly to a film of this character to which a gelatin-silver halide emulsion layer will adhere strongly under conditions of use.

An important object of this invention is to provide a subbed cellulose triacetate film to support a gelatin-silver halide emulsion layer.

Other objects of this invention will be apparent from the following detailed description and claims.

According to the present invention, a cellulose triacetate film base is subbed by first coating the same with a layer of secondary cellulose acetate and then applying to said first coating a second layer containing a mixture of secondary cellulose acetate and gelatin. The cellulose triacetate film base coated in this manner is then ready for the application of a gelatin-silver halide emulsion layer which will adhere strongly to the subbed film base under conditions of use. If desired, both sides of the film base may be coated to minimize any tendencies for the film base to curl and also to provide a subbing onto which there may be coated other layers, for example, antihalation layers and the like.

The cellulose triacetate film base is made of cellulose acetate having an acetyl value of at least 58% by weight, or, preferably at least 61.0% by weight, calculated as acetic acid. This film base contains between 9 and 23% by weight or, preferably, between 11 and 17% by weight of a plasticizer to improve the physical properties thereof. Examples of suitable plasticizers that can be used for this purpose, either singly or in combination, are triphenyl phosphate and diethyl phthalate. The film base has a thickness normally ranging between 0.003 and 0.0075 inch and is prepared by casting the cellulose triacetate onto a smooth metal or other surface from solution in a suitable solvent, for example, a mixture of methylene chloride and methanol.

In the subbing process, the cellulose triacetate film base is coated with a layer of secondary cellulose acetate having an acetyl value of between 52 and 56% by weight, or, preferably, between 52.3 and 53.5% by weight, calculated as acetic acid. The secondary cellulose acetate is applied to the film base from solution in a solvent that will dissolve cellulose acetate having this acetyl value, that will be sufficiently active with respect to the cellulose triacetate of the film base to anchor the layer of secondary acetate, but that is not so active that it will cause the cellulose triacetate film base to distort. Acetone is a suitable solvent for this purpose. However, a better solvent is a mixture of methylene chloride and methanol in proportions by weight ranging from 90:10 to 80:20, together with from 25 to 100 parts of acetone for each 100 parts of the methylene chloride/methanol mixture. The secondary cellulose acetate layer is applied to the film base as a solution having a solid content of between 1 and 3%,or, preferably, between 1.5 and 2.5% by weight, at a temperature between 20 and 25° C. in any suitable manner, for example, with the use of beading rolls or the like. Following application of the coating, it is dried at a temperature of between 35 and 50° C. with air having a dewpoint between 5 and 14° C. The secondary cellulose acetate layer should have a thickness of between 0.0001 and 0.0003 inch, or, preferably between 0.0001 and 0.00015 inch.

After the secondary cellulose acetate layer has dried, there is applied thereto a second layer containing a mixture of secondary cellulose acetate and gelatin. The secondary cellulose acetate in this layer should have an acetyl value of between 52 and 56% by weight, or preferably, between 52.3 and 53.5% by weight, calculated as acetic acid. The best adhesion between this second layer and the first layer of secondary acetate is achieved when the acetyl value of the secondary cellulose acetate in both layers is the same. For each part by weight of gelatin, there should be present in the second layer between 0.1 and 1 part by weight, or, preferably, between 0.2 and 0.3 part by weight of the secondary cellulose acetate.

To prepare the coating composition from which the second layer is applied the gelatin is first swollen and melted with a small proportion of water ranging between 2 and 3 parts by weight for each part by weight of the gelatin together with a small proportion of methanol, if desired. At this stage, a peptizing agent such as acetic acid, salicylic acid or phthalic acid is stirred into the melt to assist in preventing the precipitation of the gelatin. There is then added to the melt a further proportion of methanol sufficient to bring the total quantity of methanol to between 10 and 30 parts by weight for each part by weight of the gelatin. The presence of the methanol and peptizing agent is necessary to make the gelatin melt miscible with the secondary cellulose acetate solution with which it is to be mixed. The secondary cellulose acetate is dissolved in a mixture of acetone and methanol which is proportioned so that the final solution will have an acetone/methanol ratio of between 50:50 to 70:30. The volume of the secondary acetate solution is 4 to 5 times the volume of the gelatin melt. The gelatin melt and the secondary cellulose acetate solution are then mixed and there is added to the mixture a hardening agent, such as formaldehyde in solution in methanol to harden the gelatin.

The final solution containing the gelatin and secondary cellulose acetate is applied to the once coated cellulose triacetate film base at a temperature between 20 and 30° C. in any suitable manner, for example, by the use of beading rolls or the like. The second coating is then dried at a temperature between 40 and 55° C. with air having a dewpoint between 5 and 14° C. The second coating should have a coating weight of between 0.06 and 0.10 gram per square foot, and, preferably, between 0.08 and 0.09 gram per square foot.

The subbed cellulose triacetate film base is then ready for coating with a gelatin-silver halide emulsion layer. The said emulsion layer has been found to adhere to the subbed film base very strongly when dry and also during and after photographic processing. In addition, the subbing layers adhere strongly to one another and to the film base so that the film remains together as a unit during use.

The following example is given to illustrate this invention further.

Example

There is entered into a mixing tank 1200 parts by weight of methanol followed by 204 parts by weight of cellulose acetate having an acetyl value of 53% by weight, calculated as acetic acid, and the whole is mixed to form a slurry. With mixing continued, there is added to the slurry 6800 parts by weight of methylene chloride and then 2000 parts by weight of acetone. Mixing is continued until the cellulose acetate dissolves which takes about 15 minutes. The solution is filtered and is then coated by means of a beading roll onto a cellulose triacetate film base 0.005 inch thick having an acetyl value of 61% by weight, calculated as acetic acid, at a rate sufficient to deposit a layer 0.0001 inch thick after drying. The once-coated film base is then dried at 44° C. with air having a dewpoint of 10° C. which requires about 5 minutes.

The second coating composition is prepared by introducing into a mixing tank equipped with a rake-type stirrer 160 parts by weight of methanol. There is then introduced into the tank 100 parts by weight of gelatin and the whole is mixed thoroughly to wet the gelatin grains with methanol. Then, 200 parts by weight of water is added, the mixing is stopped and heat is applied to bring the temperature to 50° C. and melt the gelatin. There is added slowly, with stirring, to the molten gelatin a solution of 48 parts by weight of phthalic acid in 385 parts by methanol and the temperature is again brought up to 50° C. Finally, 1860 parts by weight of methanol is added at a slow rate to avoid chilling the solution. A second solution is then prepared by entering 3125 parts by weight of methanol into a mixing tank, followed by 25 parts by weight of the same secondary cellulose acetate as used in the first coating on the film base. The secondary cellulose acetate and methanol are then mixed to form a suspension and 8300 parts by weight of acetone is added to the tank and mixing continued until a solution is obtained. The solution is brought to a temperature of 30° C. The gelatin solution is heated to a temperature of 50° C. and slowly mixed into the secondary cellulose acetate solution which is at a temperature of 30° C. There is then added a solution made by mixing 12 parts by weight of 38% aqueous formaldehyde and 20 parts by weight of methanol. The final solution obtained is aged for 15 hours at room temperature and filtered, and is then coated by means of a beading roll onto the once coated cellulose triacetate film base at a rate sufficient to deposit a layer of coating weight 0.09 gram per square foot after drying. The twice-coated film base is then dried at 44° C. with air having a dewpoint of 10° C. which requires about 5 minutes.

There is then applied to the subbed film base a conventional gelatin-silver halide emulsion. The emulsion shows a strong adherence to the subbed film base as shown by a test during which the film is torn with a twisting motion. No particles of emulsion greater than $\frac{1}{16}$" separate from the film as it is torn. The film is then developed with a strongly alkaline developer, rinsed, fixed in an acid fixing bath and washed. There is no tendency for either the emulsion layer or the subbing layers to separate during this processing. The wet film has a piece of emulsion gouged out of it and is then rubbed hard over the gouged portion with the ball of the thumb. There is no separation of either the emulsion, or the subbing layers showing good wet adhesion.

In the claims, all the acetyl values are calculated as acetic acid.

It is to be understood that the foregoing detailed description is merely given by way of illustration and that many variations may be made therein without departing from the spirit of our invention.

Having described our invention, what we desire to secure by Letters Patent is:

1. Method for subbing a cellulous triacetate film having an acetyl value of at least 58% by weight which comprises applying to said film a coating composition comprising a solution of cellulose acetate having an acetyl value between 52 and 56% by weight, calculated as acetic acid, in a solvent comprising methylene chloride and methanol, drying said solution to thereby deposit a layer of said secondary cellulose acetate on said film, applying to said deposited layer a second coating composition comprising a solution of gelatin, an acid peptizing agent for said gelatin, and cellulose acetate having an acetyl value between 52 and 56% by weight, calculated as acetic acid, in a solvent comprising methanol and acetone and drying said second coating composition to thereby deposit a second layer comprising secondary cellulose acetate and gelatin on said film.

2. Method for subbing a cellulose triacetate film having an acetyl value of at least 58% by weight which comprises preparing a first solution comprising cellulose acetate, having an acetyl value of 52 to 56% by weight, calculated as acetic acid, methylene chloride, methanol and acetone, preparing a second solution comprising gelatin, methanol and phthalic acid, preparing a third solution comprising cellulose acetate having an acetyl value of 52 to 56% by weight, calculated as acetic acid, methanol, and acetone, blending said second and third solutions, applying said first solution to said film and drying to thereby deposit a layer of cellulose acetate on said film, applying said blend of second and third solutions to said deposited layer and drying to thereby deposit a second layer on said film comprising cellulose acetate and gelatin.

References Cited in the file of this patent

UNITED STATES PATENTS

| | | |
|---|---|---|
| 1,074,092 | Mork | Sept. 23, 1913 |
| 1,570,077 | Pitman | Jan. 19, 1926 |
| 2,271,228 | Nadeau et al. | Jan. 27, 1942 |

FOREIGN PATENTS

| | | |
|---|---|---|
| 546,825 | Great Britain | July 31, 1942 |